(12) United States Patent
Schultz et al.

(10) Patent No.: US 6,768,214 B2
(45) Date of Patent: Jul. 27, 2004

(54) VIBRATION BASED POWER GENERATOR

(75) Inventors: Roger L. Schultz, Aubrey, TX (US);
Robert K. Michael, Plano, TX (US);
Clark E. Robison, Tomball, TX (US);
Paul D. Ringgenberg, Spring, TX (US)

(73) Assignee: Halliburton Energy Services, Inc., Dallas, TX (US)

( * ) Notice: Subject to any disclaimer, the term of this patent is extended or adjusted under 35 U.S.C. 154(b) by 0 days.

(21) Appl. No.: 09/912,262

(22) Filed: Jul. 24, 2001

(65) Prior Publication Data

US 2002/0096887 A1 Jul. 25, 2002

Related U.S. Application Data

(63) Continuation-in-part of application No. 09/493,801, filed on Jan. 28, 2000, now abandoned.

(30) Foreign Application Priority Data

Jul. 28, 2000 (WO) ............................... PCT/US00/20616

(51) Int. Cl.⁷ ................................................. H02P 9/04
(52) U.S. Cl. ........................................ 290/1 R; 290/54
(58) Field of Search .......................... 290/54, 1 A, 1 R; 310/323.06, 321; 166/65.1

(56) References Cited

U.S. PATENT DOCUMENTS

| | | |
|---|---|---|
| 3,448,305 A | 6/1969 | Raynal et al. |
| 3,558,936 A | 1/1971 | Horan |
| 3,970,877 A | 7/1976 | Russell et al. |
| 4,158,368 A | 6/1979 | Clark |
| 4,246,765 A | 1/1981 | Zabcik |
| 4,387,318 A | 6/1983 | Kolm et al. |
| 4,491,738 A | 1/1985 | Kamp |
| 4,518,888 A | 5/1985 | Zabcik |
| 4,669,068 A | 5/1987 | Klatt |
| 4,772,813 A | 9/1988 | Mohri et al. |
| 5,317,223 A | 5/1994 | Kiesewetter et al. |
| 5,353,873 A | 10/1994 | Cooke, Jr. |
| 5,839,508 A | 11/1998 | Tubel et al. |
| 5,965,964 A | 10/1999 | Skinner et al. |
| 5,982,708 A | 11/1999 | Pearce |
| 6,011,346 A | 1/2000 | Buchanan et al. |

FOREIGN PATENT DOCUMENTS

| | | |
|---|---|---|
| FR | 2626729 A | 8/1989 |
| GB | 2153410 A | 8/1985 |
| JP | 09163771 A | 6/1997 |
| WO | WO 97/01018 A | 1/1997 |
| WO | WO 02/057589 A2 | 7/2002 |

OTHER PUBLICATIONS

John V. Bouyoucos, "Self–Excited Hydrodynamic Oscillators", NR–014–903, Technical Memorandum; Dated Jul. 31, 1955.

Etrema Products, Inc., product brochure, undated John V. Bouyoucos, "Self–Excited Hydrodynamic Oscillators", NR–014–903, technical memorandum, dated Jul. 31, 1955.

*Primary Examiner*—Joseph Waks
(74) *Attorney, Agent, or Firm*—Marlin R. Smith

(57) ABSTRACT

Electrical power generators and methods of producing power in a subterranean well are provided. In a described embodiment, fluid flow through a fluid conduit causes a member to displace or vibrate. The displacement of the member is utilized to induce strain in a piezoelectric material, thereby causing the piezoelectric material to produce electricity. Various means may be used to create turbulence in the fluid flow, thereby increasing displacement of the member, resulting in increased power output from the generator.

101 Claims, 8 Drawing Sheets

VIBRATION BASED POWER GENERATOR

CROSS-REFERENCE TO RELATED APPLICATIONS

The present invention claims the benefit of the filing date under 35 USC §119 of PCT application serial no. PCT/Us00/20616, filed Jul. 28, 2000, and is a continuation-in-part under 35 USC §120 of U.S. application Ser. No. 09/493,801, filed Jan. 28, 2000 now abandoned. Both of these prior applications are incorporated herein by this reference.

BACKGROUND

The present invention relates generally to equipment utilized and operations performed in conjunction with subterranean wells and, in an embodiment described herein, more particularly provides an electrical power generator.

Electrical power for use in a downhole environment has generally in the past been either stored in a device, such as a battery, and conveyed downhole or it has been transmitted via conductors, such as a wireline, from the surface or another remote location. As is well known, batteries have the capability of storing only a finite amount of power therein and have environmental limits, such as temperature, on their use. Additionally, batteries are not readily recharged downhole.

Electrical conductors, such as those in a conventional wireline, provide a practically unlimited amount of power, but require special facilities at the surface for deployment and typically obstruct the production flowpath, thereby preventing the use of safety valves, limiting the flow rate of fluids through the flowpath, etc., while the conductors are in the flowpath. Thus, wireline operations are typically carried out prior to the production phase of a well, or during remedial operations after the well has been placed into production.

In other circumstances, such as relatively permanent production situations, the conductors may be positioned external to a tubing string. For example, such external conductors have been used for powering and communicating with sensors in production situations. However, this makes running the tubing string very time-consuming and often results in unreliable electrical connections, etc.

What is needed is a new method of generating electrical power. The method should not require that power be stored in a device and then conveyed downhole or to another remote location where it is difficult to recharge. The method should also not require that power be transmitted from a remote location via one or more conductors positioned in a production flowpath of a well or external to a tubing string in the well. It is accordingly an object of the present invention to provide a new method whereby power is generated, and to provide an apparatus for such power generation.

SUMMARY

In carrying out the principles of the present invention, in accordance with an embodiment thereof, a power generator and associated method are provided which solve the above problems in the art. The power generator operates by displacing a member thereof in response to pressure changes in the generator, for example, due to fluid flow through the generator. A piezoelectric material produces electricity when the member displaces. The power generator may be used in a downhole environment or in conjunction with fluid flow through any conduit.

In one aspect of the present invention, a power generator includes a fluid conduit and a piezoelectric material attached to the conduit. When a pressure change is experienced in the conduit, such as, due to fluid flowing through the conduit, the piezoelectric material produces electricity, due to flexing of the conduit. The conduit may include a reduced thickness portion, which has an increased degree of flexing in response to the fluid flow, with the piezoelectric material being attached to the reduced thickness portion.

In another aspect of the present invention, a power generator includes a mass reciprocably disposed relative to an outer housing of the generator. A bias member is positioned between the mass and a piezoelectric material. Fluid flowing through the housing causes the mass to displace and thereby induce strain in the piezoelectric material via the bias member. A fluid conduit may extend in the housing, with the mass, bias member and piezoelectric material being positioned between the conduit and the housing. Fluid flow through the conduit may be diverted to flow between the conduit and the housing.

In still another aspect of the present invention, a power generator includes a fluid conduit and a fluid chamber in fluid communication with the fluid conduit. The chamber vibrates in response to pressure changes in the conduit, such as, due to the flow of fluid through the conduit. A piezoelectric material attached to the chamber produces electricity when the chamber vibrates. The piezoelectric material may be attached to internal or external walls of the chamber, to a membrane bounding a portion of the chamber, or to a piston used to adjust a volume of the chamber.

In yet another aspect of the present invention, a power generator includes a fluid conduit and a member extending into a flow passage of the fluid conduit. The member vibrates in response to fluid flow through the fluid conduit. A piezoelectric material produces electricity in response to the vibration of the member. The member may extend generally transversely relative to the flow passage, and the piezoelectric material may support the member in position relative to the fluid conduit.

In a further aspect of the present invention, a power generator includes a fluid conduit and a member having an orifice formed therethrough. Fluid flowing through the fluid conduit also flows through the orifice, causing the member to vibrate. A piezoelectric material produces electricity when the member vibrates.

In a still further aspect of the present invention, a power generator includes a fluid conduit, a member displacing within the fluid conduit in response to fluid flow through the fluid conduit, a retainer preventing displacement of the member out of the fluid conduit, and a piezoelectric material producing electricity in response to displacement of the member. The member may be a sphere which is retained in an enlarged cavity in the fluid conduit. The piezoelectric material may be positioned between the member and the fluid conduit, or it may be positioned between the retainer and the fluid conduit, so that when the member contacts the retainer, strain is induced in the piezoelectric material.

In an additional aspect of the present invention, a power generator includes a fluid conduit having a flow passage formed therethrough and a cavity. A membrane separates the flow passage from the cavity. The membrane flexes in response to pressure changes in the flow passage, such as, due to fluid flow through the flow passage, and a piezoelectric material disposed within the cavity produces electricity in response to the membrane flexing.

In another aspect of the present invention, displacement of a member in response to fluid flowing through a flow passage is increased by inducing turbulence in the fluid flow. A fluid conduit through which the flow passage extends may be shaped to induce the turbulence, for example, by helically shaping the fluid conduit, or by helically forming a recess or protrusion internally or externally on the fluid conduit. Protrusions may also extend into the flow passage upstream of the member.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
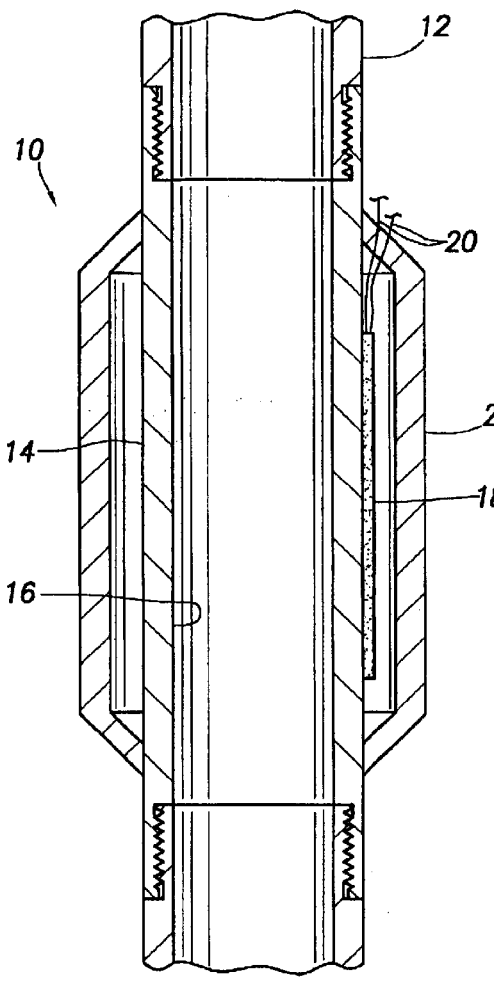
FIG. 1 is a schematic cross-sectional view of a first power generator embodying principles of the present invention.

Representatively and schematically illustrated in FIG. 1 is a power generator 10 which embodies principles of the present invention. In the following description of the generator 10 and other apparatus and methods described herein, directional terms, such as "above", "below", "upper", "lower", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

As depicted in FIG. 1, the generator 10 is interconnected in a tubular string 12, such as a production tubing string, positioned in a subterranean well. Fluid flow through the tubular string 12 is utilized to generate electrical power from the generator 10. It is to be clearly understood that the generator 10, and the other generators described herein, may be used in other types of tubular strings, such as a drill string or injection tubing string, in other types of fluid conduits, such as a subsea fluid conduit, may be used during stimulation or drill stem testing, may be used as a flowmeter, may be used as a power source for logging while drilling and measurement while drilling operations, and may be used in other methods, without departing from the principles of the present invention. Thus, the description herein of the generator 10 used in the tubular string 12 is not to be taken as limiting of the utility of the present invention.

The generator 10 includes a fluid conduit 14 with a flow passage 16 extending therethrough. As fluid flows through the flow passage 16, the conduit 14 flexes somewhat, due to pressure fluctuations in the fluid. This flexing of the conduit 14 induces strain in a piezoelectric material 18, such as PZT, attached externally to the conduit. Of course, the conduit 14 may be made to flex by pressure changes in the flow passage 16, without the pressure changes being caused by fluid flow through the flow passage.

The piezoelectric material 18 could be otherwise attached to the conduit 14, for example, it may be attached internally to the conduit. An outer housing 22 encloses and protects the piezoelectric material 18.

As is well known to those skilled in the art, piezoelectric material produces electricity when strain is induced in the material. Thus, the piezoelectric material 18 of the generator 10 produces electricity when the conduit 14 flexes in response to fluid flow therethrough.

The electricity produced by the piezoelectric material 18 is conducted via lines 20 to an electrical power consuming device (not shown) either remote from the generator 10 or in close proximity thereto. For example, the electricity may be used to charge a battery or to power an electrical device, either in another tool elsewhere in the well, or within the housing 22.

Figure 2:
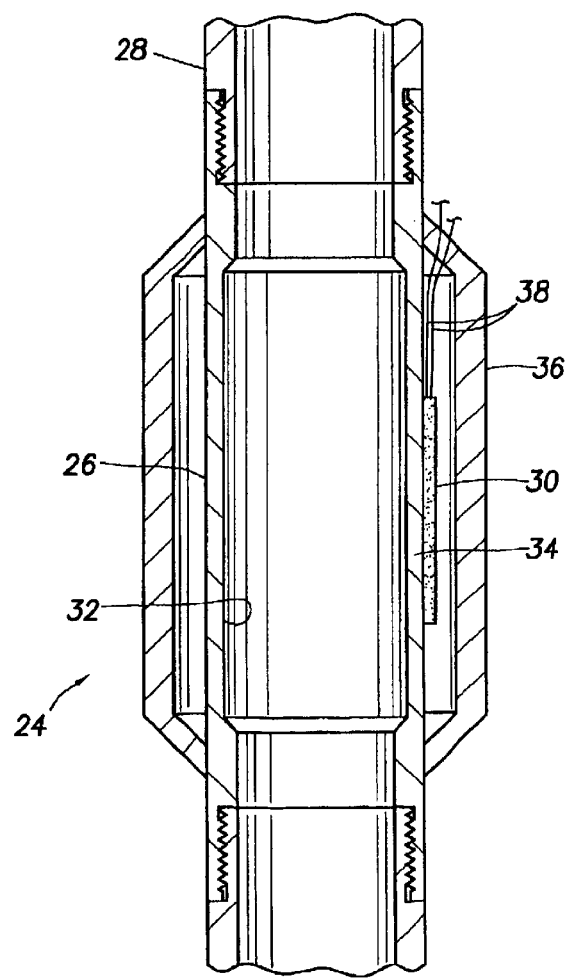
FIG. 2 is a schematic cross-sectional view of a second power generator embodying principles of the present invention.

Referring additionally now to FIG. 2, another power generator 24 embodying principles of the present invention is representatively and schematically illustrated. The generator 24 is similar to the generator 10 described above, in that it includes a fluid conduit 26 configured for interconnection in a tubular string 28 in a subterranean well as and a piezoelectric material 30 attached to the conduit, so that the piezoelectric material produces electricity when pressure changes are experienced in the conduit, such as when fluid is flowed through the conduit. However, a flow passage 32 extending through the conduit 26 has a radially enlarged portion, thereby forming a radially reduced thickness portion 34 of the conduit.

It will be readily appreciated by one skilled in the art that the reduced thickness portion 34 of the conduit 26 will flex greater in response to pressure fluctuations in the flow passage 32 than the remainder of the conduit. This increased degree of flexing is used to induce greater strain in the piezoelectric material 30 and, thus, produce greater electrical power output from the piezoelectric material as compared to the generator 10 described above. Note that the reduced thickness portion 34 could be otherwise created, for example, by providing a reduced outer dimension of the conduit 26, etc.

Similar to the generator 10, the generator 24 also includes an outer housing 36 for providing protection to the piezoelectric material 30. Lines 38 conduct electricity from the piezoelectric material 30 to a power consuming device (not shown) either remote from or in close proximity to the generator 24.

Figure 3:
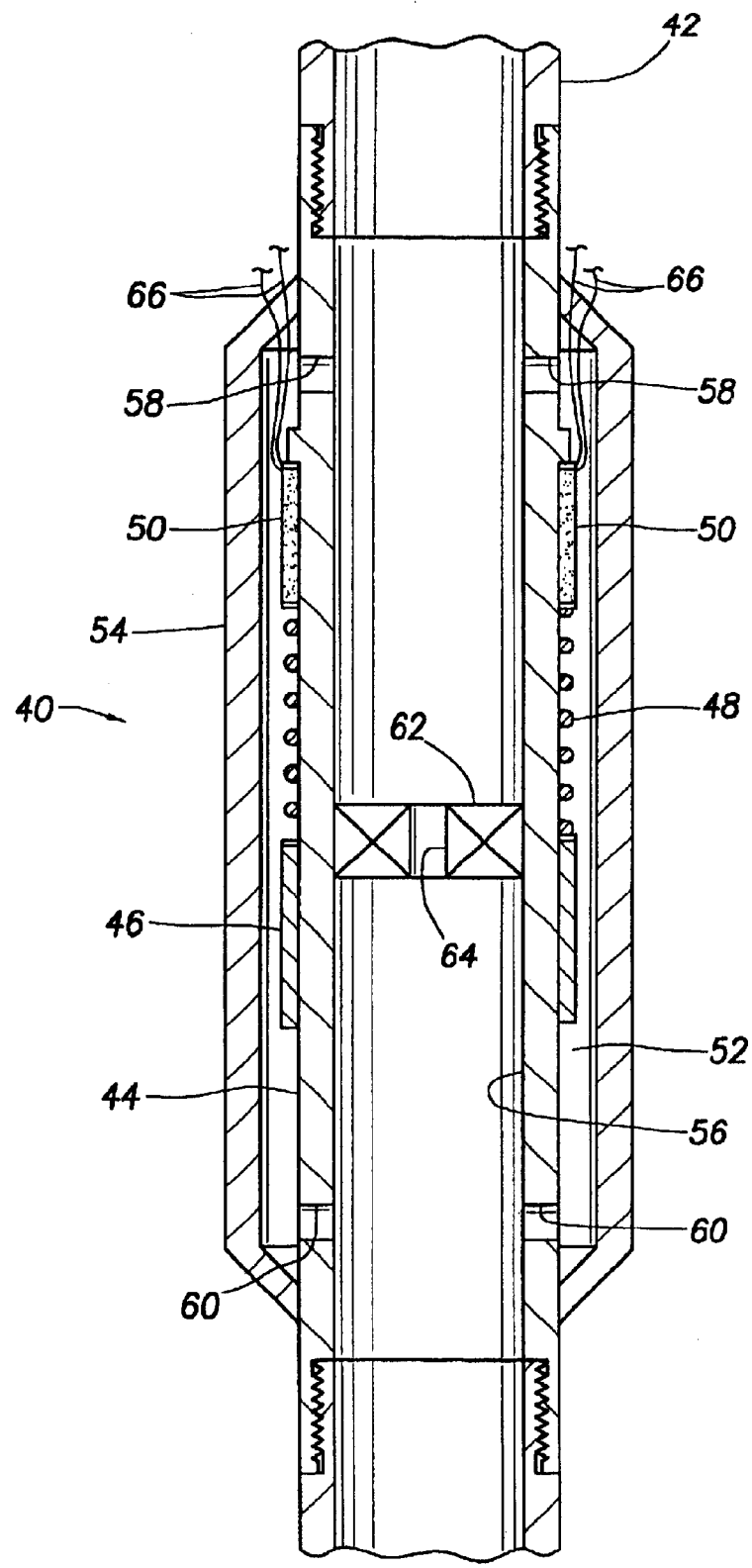
FIG. 3 is a schematic cross-sectional view of a third power generator embodying principles of the present invention.

Referring additionally now to FIG. 3, another power generator 40 embodying principles of the present invention is representatively and schematically illustrated. The generator 40 is depicted in FIG. 3 interconnected in a tubular string 42 and positioned in a subterranean well. Fluid flow through a fluid conduit 44 of the generator 40 is used to displace a mass 46 to load a bias member 48, such as a spring, and thereby induce strain in a piezoelectric material 50.

The mass 46, spring 48 and piezoelectric material 50 are disposed in a chamber 52 formed radially between the conduit 44 and an outer housing 54. Fluid communication between a flow passage 56 extending through the conduit 44 and the chamber 52 is provided by openings 58, 60 above and below, respectively, a plug 62 in the flow passage 56. The plug 62 may completely prevent fluid flow directly through the flow passage 56, in which case all of the fluid flowing through the flow passage is bypassed through the chamber 52. Alternatively, the plug 62 may permit some fluid flow through an opening 64 therein, in which case only a portion of the fluid flowing through the flow passage is bypassed through the chamber 52.

As fluid flows through the chamber 52 between the openings 58, 60, the mass 46 is caused to displace, due to the resistance to fluid flow thereacross and pressure fluctuations in the flowing fluid. As the mass 46 displaces, the spring 48 is loaded (that is, force is stored therein) and this results in strain being induced in the piezoelectric material 50. Strain in the piezoelectric material 50 causes it to produce electricity, which is conducted via lines 66 to an electrical power consuming device (not shown) either remote from or in close proximity to the generator 40.

Figure 4:
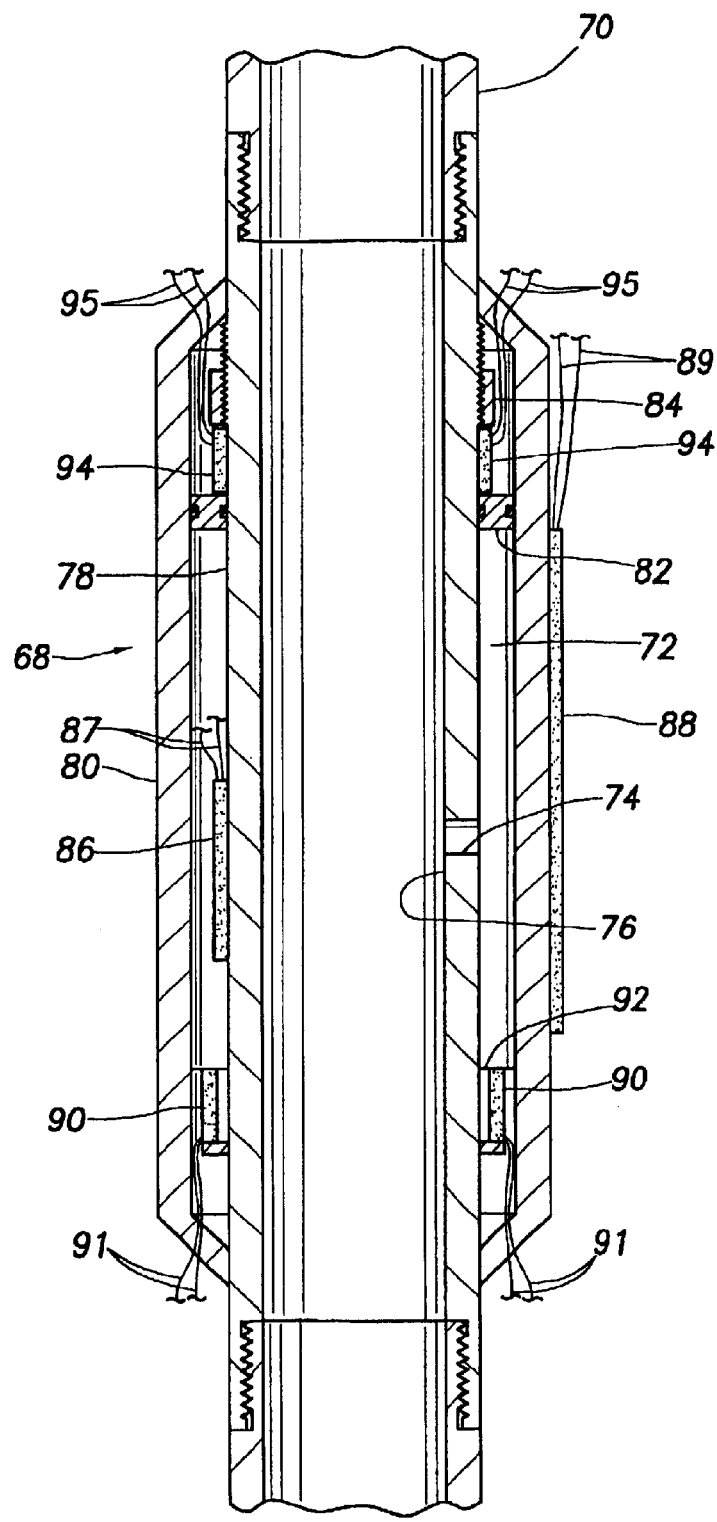
FIG. 4 is a schematic cross-sectional view of a fourth power generator embodying principles of the present invention.

Referring additionally now to FIG. 4, another power generator 68 embodying principles of the present invention is representatively and schematically illustrated. As depicted in FIG. 4, the generator 68 is interconnected in a tubular string 70 and positioned in a subterranean well. The generator 68 includes a fluid chamber 72 in fluid communication via an opening 74 with a flow passage 76 extending in a fluid conduit 78. The chamber 72 is formed radially between the conduit 78 and an outer housing 80.

It will be readily appreciated by one skilled in the art that, when pressure fluctuations are experienced in the flow passage 76, such as, due to fluid flowing through the flow passage 76, the chamber 72 will vibrate. Preferably, the chamber 72 is "tuned" so that it vibrates at one or more of its resonant frequencies commensurate with the velocity, density, etc. of the fluid flowing past the opening 74. For example, the volume of the chamber 72 may be adjusted to "tune" the chamber to an appropriate resonant frequency. One way to adjust the volume of the chamber 72 is to provide a piston 82 displaceable by a threaded collar 84, so that as the piston is displaced, the volume of the chamber may be increased or decreased as desired.

Various methods may be used to generate electrical power from the vibration of the chamber 72. Piezoelectric material 86 may be attached internally or externally to the conduit 78 where it forms an inner wall of the chamber 72. Piezoelectric material 88 may be attached internally or externally to the housing 80 where it forms an outer wall of the chamber 72. Piezoelectric material go may be attached to a relatively thin membrane 92 bounding a portion of the chamber 72. Piezoelectric material 94 may be attached to the piston 82, for example, positioned between the piston and the collar 84. Of course, it will be readily appreciated that vibration of the chamber 72 may be used to generate electrical power in any other manner as well, without departing from the principles of the present invention.

Lines 87, 89, 91, 95 conduct the electricity produced by the piezoelectric materials 86, 88, 90, 94, respectively, to electrical power consuming device(s) (not shown) either remote from or in close proximity to the generator 68.

Figure 5:
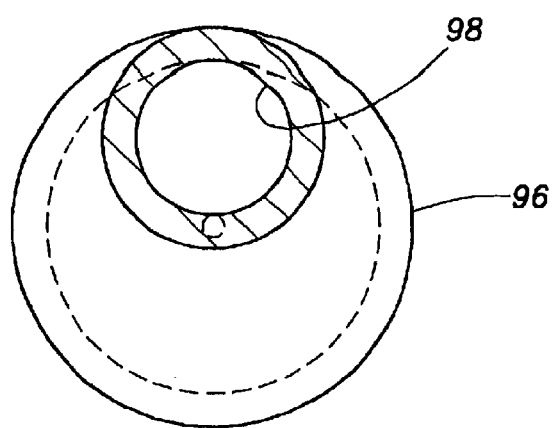
FIGS. 5 & 6 are top and side elevational views, respectively, of a first fluid conduit configuration for inducing turbulence in fluid flow therethrough.
Figure 6:
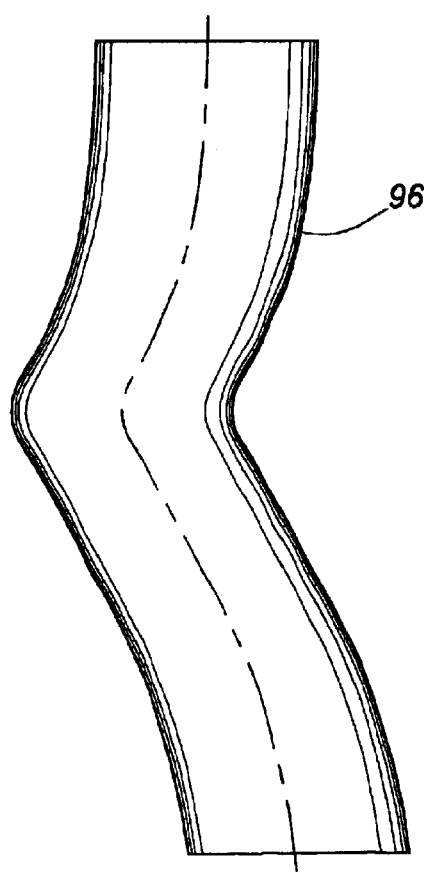

Referring additionally now to FIGS. 5 & 6, a configuration of a fluid conduit 96 which may be used in any of the power generators described herein is schematically and representatively illustrated. The conduit 96 has a helical shape. As fluid flows through a flow passage 98 extending through the conduit 96, turbulence is induced in the fluid. This turbulence is used to increase displacement of a member of a generator which responds to fluid flow therethrough.

For example, if the conduit 96 is substituted for the conduit 14 in the generator 10 described above, the conduit 96 will itself flex to a greater degree and result in increased electrical output from the piezoelectric material 18, due to increased pressure fluctuations in the flow passage 98. If the conduit 96 is substituted for the conduit 26 in the generator 24 described above (in which case the conduit 96 would be provided with the reduced wall thickness portion 34 to which the piezoelectric material 30 is attached), increased pressure fluctuations in the flow passage 98 will result in increased flexing of the portion 34 and increased electrical output of the piezoelectric material 30. If the conduit 96 is substituted for the conduit 44 in the generator 40 described above (in which case the conduit 96 would be provided with the openings 58, 6o and plug 62 for directing fluid flow to the chamber 52), increased turbulence in the fluid flowing through the flow passage 98 will be transmitted to the chamber 52 and result in increased displacement of the mass 46, thereby causing increased electrical output of the piezoelectric material 50. If the conduit 96 is substituted for the conduit 78 in the generator 68 described above (in which case the conduit 96 would be provided with the opening 74 for communication with the chamber 72), then increased turbulence in the fluid flowing through the flow passage 98 will result in increased vibration of the chamber 72, thereby causing increased electrical output of the various piezoelectric materials 86, 88, 90, 94.

Note that the conduit 96 may be made of a material, for example, titanium or a composite material, etc., which provides enhanced flexure of the conduit due to pressure fluctuations therein, for those embodiments of power generators described herein in which electrical power is produced in response to flexure of a fluid conduit.

Figure 7:
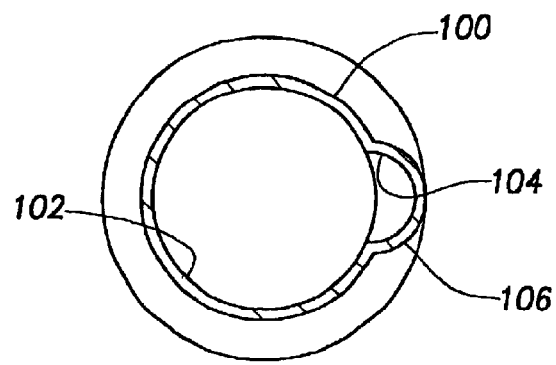
FIGS. 7 & 8 are top and side elevational views, respectively, of a second fluid conduit configuration for inducing turbulence in fluid flow therethrough.
Figure 8:
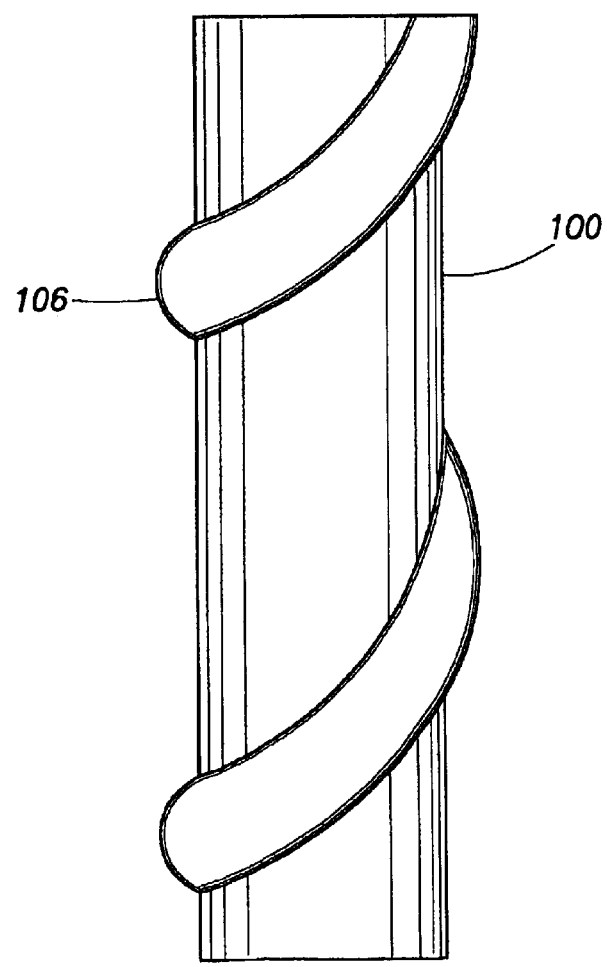

Referring additionally now to FIGS. 7 & 8, another configuration of a fluid conduit 100 which may be used in any of the power generators described herein to induce turbulence in fluid flow is representatively and schematically illustrated. The conduit 100 has a flow passage 102 extending therethrough. A recess 104 is formed internally on the conduit 100 and extends helically therein (the recess forming part of the flow passage 102), so that turbulence is induced in fluid flow through the flow passage.

In a similar manner to that described above for the conduit 96, the increased turbulence in the flow passage 102 caused by the helical recess 104 may be used to increase electrical output from any of the power generators described herein. Additionally, the conduit 100 includes an external protrusion 106 formed helically thereon, which may be used to increase turbulence in fluid flowing external to the conduit 100. For example, if the conduit 100 is substituted for the conduit 44 in the generator 40 described above, the protrusion 106 may be used to increase turbulence in the fluid flowing through the chamber 52.

Note that the conduit 100 may be made of a material, for example, titanium or a composite material, etc., which provides enhanced flexure of the conduit due to pressure fluctuations therein, for those embodiments of power generators described herein in which electrical power is produced in response to flexure of a fluid conduit.

It is to be clearly understood that the above examples of conduits 96, 100 which are shaped to increase turbulence in fluid flow through a downhole power generator are provided only to illustrate the large variety of such methods of increasing turbulence, and any other means of increasing turbulence in fluid flow may be utilized, without departing from the principles of the present invention. For example, it is not necessary for helical shapes to be used, since fluid conduits could instead be corrugated internally and/or externally, have other types of recesses and/or protrusions formed internally and/or externally thereon, etc. to increase turbulence in fluid flow.

Figure 9:
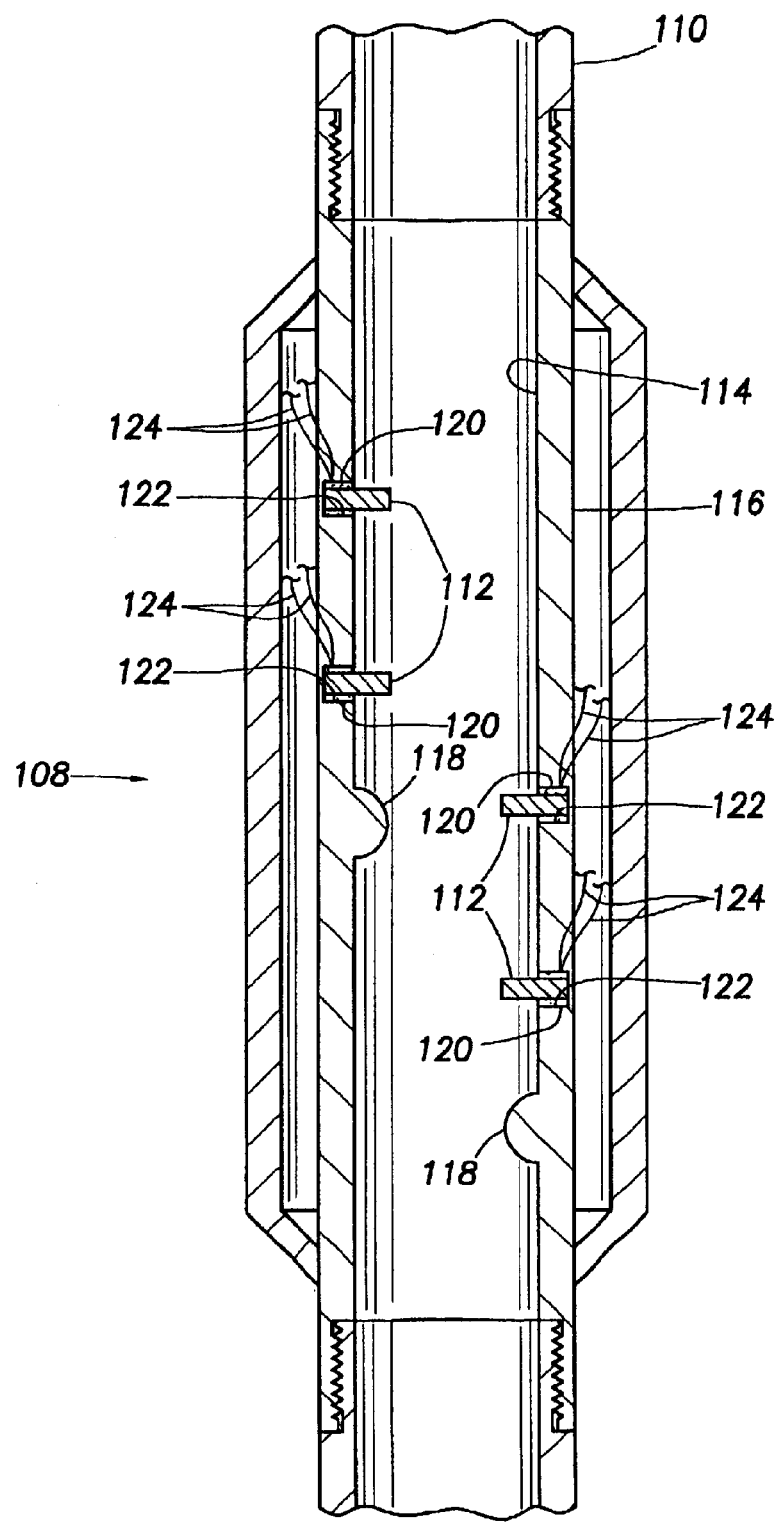
FIG. 9 is a schematic cross-sectional view of a fifth power generator embodying principles of the present invention.

Referring additionally now to FIG. 9, another power generator 108 embodying principles of the present invention is representatively and schematically illustrated. In FIG. 9, the generator 108 is depicted interconnected in a tubular string 110 positioned in a subterranean well. The generator 108 includes members 112 which extend inwardly into a flow passage 114 formed through a fluid conduit 116.

Note that the members 112 extend generally transversely to the direction of fluid flow through the flow passage 114. It will be readily appreciated that the members 112 will vibrate as fluid flows through the flow passage 114 and across the members. To increase the vibration of the members 112, protrusions 118 may be provided in the flow passage upstream of the members to induce turbulence in the fluid flowing thereacross. Of course, any other means of inducing turbulence in the fluid flowing across the members 112 may be utilized, without departing from the principles of the present invention.

Piezoelectric material 120 is disposed between each of the members 112 and the conduit 116 in recesses 122 formed internally on the conduit. The piezoelectric material 120 supports the members 112 in position relative to the conduit 116 and may encircle each member, so that displacement of the member in any direction induces strain in the piezoelectric material, resulting in an electrical output from the piezoelectric material.

The protrusions 118, by increasing turbulence in the fluid flowing across the members 112, increases the displacement of the members and thereby increases the electricity produced by the piezoelectric material 120. Lines 124 conduct the electricity to an electrical power consuming device (not shown) either remote from or in close proximity to the generator 108.

Figure 10:
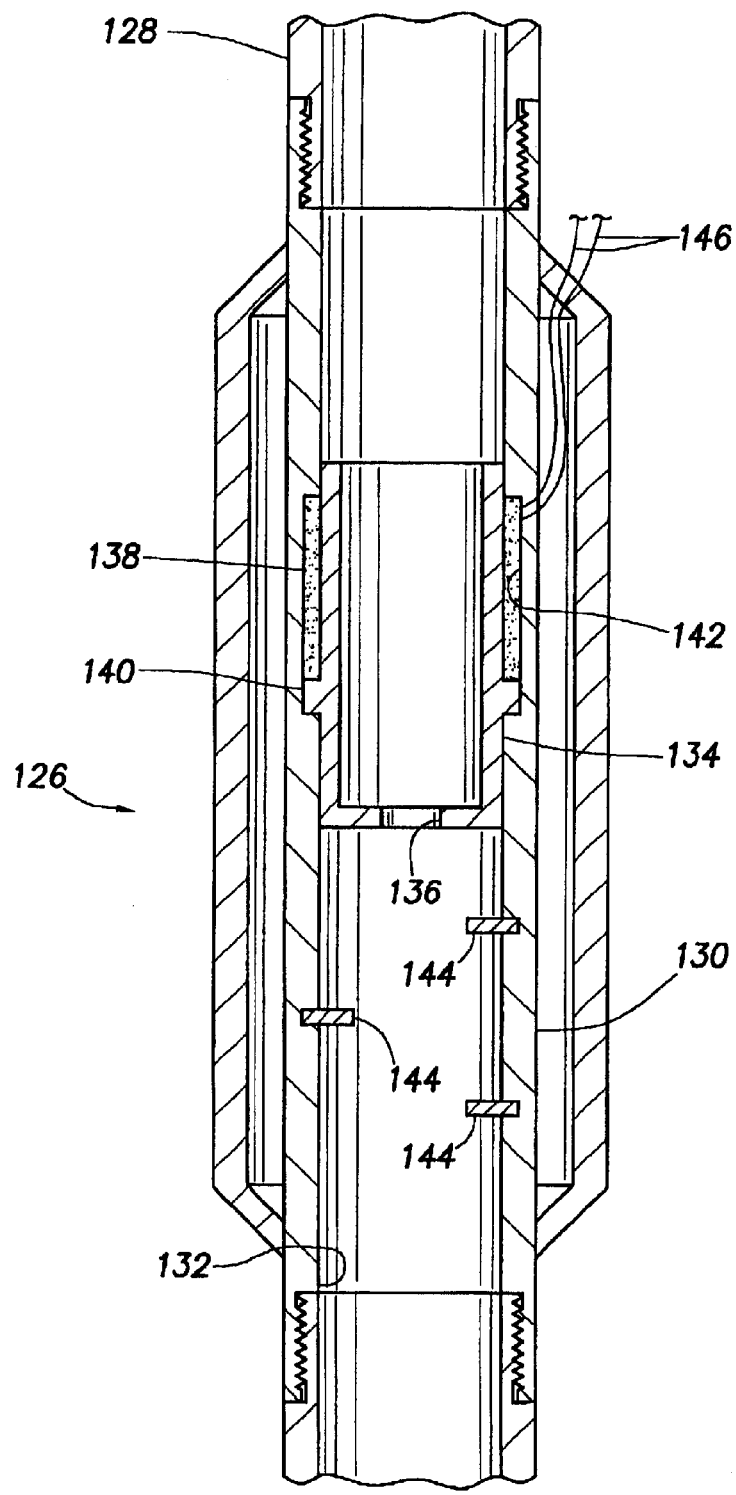
FIG. 10 is a schematic cross-sectional view of a sixth power generator embodying principles of the present invention.

Referring additionally now to FIG. 10, another power generator 126 embodying principles of the present invention is representatively and schematically illustrated. The generator 126 is depicted in FIG. 10 interconnected in a tubular string 128 positioned in a subterranean well. The generator 126 includes a fluid conduit 130 having a flow passage 132 extending therethrough and a member 134 having an orifice 136 formed therethrough. Fluid flowing through the flow passage 132 also flows through the orifice 136.

The member 134 is reciprocably disposed in the flow passage 132. It will be readily appreciated that, as fluid flows through the orifice 136, the member 134 will vibrate relative to the conduit 130. This displacement of the member 134 is used to induce strain in a piezoelectric material 138 positioned between a radially enlarged portion 140 of the member and the conduit 130 in a recess 142 formed internally on the conduit.

Protrusions 144 extend into the flow passage 132 upstream of the orifice 136, in order to induce turbulence in the fluid flowing through the orifice. It will be readily appreciated that this increase in turbulence caused by the protrusions 144 will increase the displacement of the member 134 due to the fluid flow through the orifice 136, thereby increasing the strain induced in the piezoelectric material 138 and increasing the electrical output of the piezoelectric material. The electricity produced by the piezoelectric material 138 is conducted to an electrical power consuming device (not shown) either remote from or in close proximity to the generator 126 by lines 146.

Figure 11:
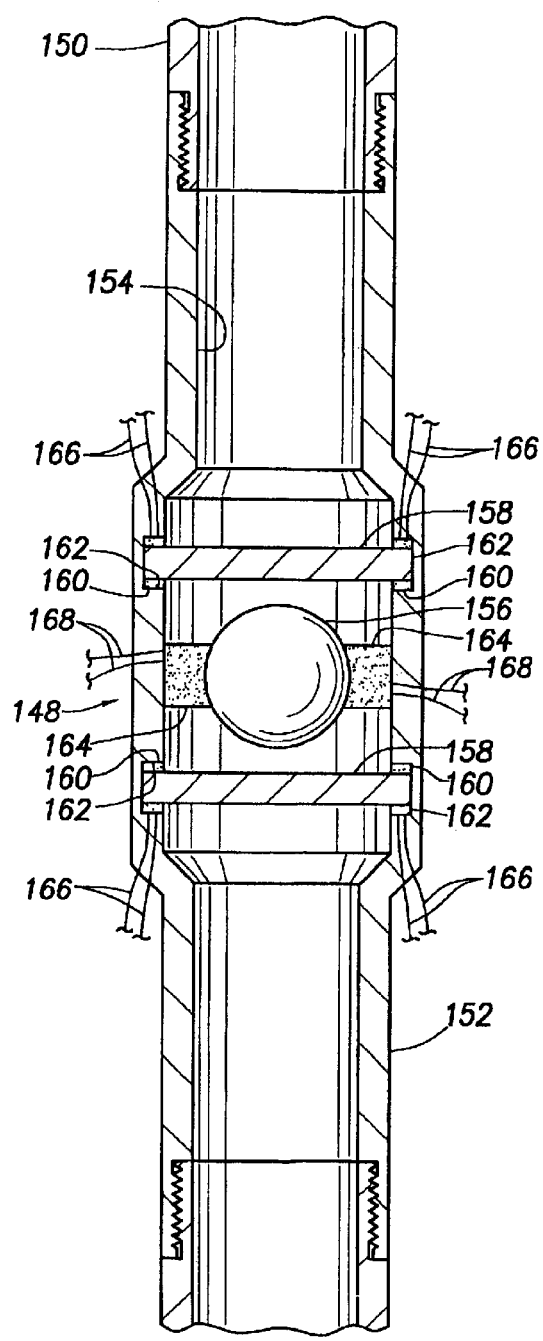
FIG. 11 is a schematic cross-sectional view of a seventh power generator embodying principles of the present invention.

Referring additionally now to FIG. 11, another power generator 148 embodying principles of the present invention is representatively and schematically illustrated. The generator 148 is depicted in FIG. 11 interconnected in a tubular string 150 positioned in a subterranean well. The generator 148 includes a fluid conduit 152 having a flow passage 154 extending therethrough and a member 156 disposed in the flow passage. Two retainers 158 prevent the member 156 from displacing out of the flow passage 154 when fluid is flowed through the flow passage.

The member 156 is shown in FIG. 11 as a sphere, but it is to be clearly understood that an otherwise-shaped member could be used in the generator 148, without departing from the principles of the present invention. It will be readily appreciated that, as fluid flows through the flow passage 154, the member 156 will displace in response thereto. Displacement of the member 156 may be used to produce electricity in the generator 148 in various manners.

For example, other than being retained in the flow passage 154 by the retainers 158, the member 156 may be free to displace in any direction within the flow passage. In that case, the member 156 will periodically contact the retainers 158 and cause some displacement of the retainers. Piezoelectric material 160 positioned between the retainers 158 and the fluid conduit 152 in recesses 162 formed internally in the conduit is strained by the displacement of the retainers and produces electricity in response thereto. The piezoelectric material 160 may encircle each end of the retainers 158 as depicted in FIG. 11 and may support the retainers 158 in position relative to the conduit 152.

As another example of a manner in which displacement of the member 156 may be used to produce electricity in the generator 148, the member 156 may be supported in position relative to the conduit 152 by piezoelectric material 164 positioned between the member and the conduit. In that case, the member 156 is not completely free to move in the flow passage 154, but instead vibrates in response to fluid flowing through the passage. This vibration of the member 156 induces strain in the piezoelectric material 164 and the piezoelectric material produces electricity in response thereto.

Lines 166 or 168 conduct the electricity produced by the piezoelectric material 160 or 164 to a power consuming device (not shown) either remote from or in close proximity to the generator 148.

Figure 12:
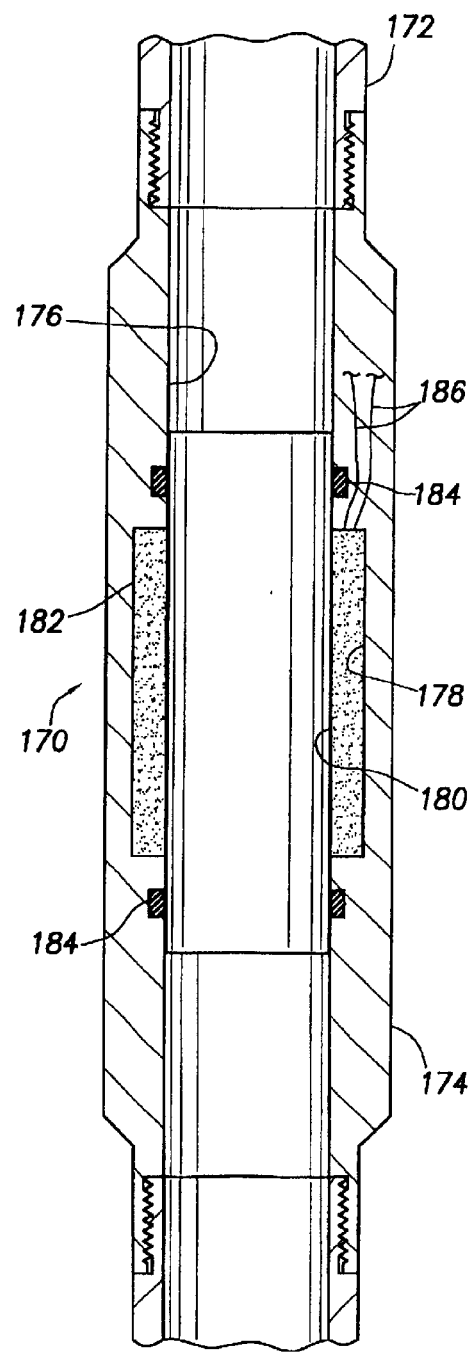
FIG. 12 is a schematic cross-sectional view of an eighth power generator embodying principles of the present invention.

Referring additionally now to FIG. 12, another power generator 170 embodying principles of the present invention is representatively and schematically illustrated. The generator 170 is depicted in FIG. 12 interconnected in a tubular string 172 positioned in a subterranean well. The generator 170 includes a fluid conduit 174 having a flow passage 176 extending therein and an annular cavity 178 formed internally therein.

A relatively thin generally tubular membrane 180 separates the flow passage 176 from the cavity 178 while still permitting fluid flow through the flow passage. It will be readily appreciated that as pressure fluctuations are experienced in the flow passage 176, such as, due to fluid flowing through the flow passage 176, the membrane 180 will flex in response to the pressure fluctuations. Flexing of the membrane 180 induces strain in a piezoelectric material 182 disposed in the cavity 178. The piezoelectric material 182 may be annular shaped and may outwardly surround the membrane 180 as depicted in FIG. 12. However, it is to be clearly understood that the membrane 180, cavity 178 and piezoelectric material 182 may be shaped other than as depicted in FIG. 12, without departing from the principles of the present invention.

The membrane 180 of the generator 170 sealingly isolates the cavity 178 from the flow passage 176. Seals 184 may be provided at each end of the membrane 180 for sealing between the membrane 180 and the conduit 174, or this sealing may be provided by other means. Preferably, the cavity 178 is at atmospheric pressure to enhance the displacement of the membrane 180 in response to pressure in the flow passage 176.

Strain induced in the piezoelectric material 182 due to the flexing of the membrane 180 causes the piezoelectric material to produce electricity. The electricity is conducted by lines 186 to an electrical power consuming device (not shown) either remote from or in close proximity to the generator 170.

Of course, a person skilled in the art would, upon a careful consideration of the above description of representative embodiments of the invention, readily appreciate that many modifications, additions, substitutions, deletions, and other changes may be made to the specific embodiments, and such changes are contemplated by the principles of the present invention. Accordingly, the foregoing detailed description is to be clearly understood as being given by way of illustration and example only, the spirit and scope of the present invention being limited solely by the appended claims.

What is claimed is:

1. An electrical power generator for use in conjunction with a subterranean well, the generator comprising:
    a fluid conduit configured for flow of fluid therethrough, the fluid conduit having an external surface having at least a selected one of inwardly and outwardly extending projections formed thereon which induces turbulence in fluid flow in the fluid conduit; and
    a piezoelectric material attached to the fluid conduit, the piezoelectric material producing electricity in response to pressure fluctuations in the conduit,
        the fluid conduit being generally tubular and being connectable in a tubular string positioned in the subterranean well.

2. The generator according to claim 1, wherein the pressure fluctuations are due to fluid flowing through the conduit.

3. The generator according to claim 1, wherein the fluid conduit includes a reduced thickness portion thereof, the piezoelectric material being attached proximate the reduced thickness portion.

4. The generator according to claim 1, wherein the piezoelectric material is attached to an external surface of the fluid conduit.

5. An electrical power generator for use in conjunction with a subterranean well, the generator comprising:
    a fluid conduit member configured for flow of fluid therethrough; and
    a piezoelectric material attached to the fluid conduit member, the piezoelectric material producing electricity in response to pressure fluctuations in the fluid conduit member caused by turbulence in fluid flow through its interior,
        the fluid conduit member including a reduced thickness portion thereof, the piezoelectric material being attached proximate the reduced thickness portion,
        the reduced thickness portion having an increased degree of flexing, in response to the pressure fluctuations in the fluid conduit member, relative to the remainder of the fluid conduit member.

6. An electrical power generator for use in conjunction with a subterranean well, the generator comprising:
    a fluid conduit member configured for flow of fluid therethrough; and
    a piezoelectric material attached to the fluid conduit member, the piezoelectric material producing electricity In response to pressure fluctuations in the fluid conduit member caused by turbulence in fluid flow through its interior,
        the fluid conduit member having a recess internally formed thereon, the recess inducing turbulence in fluid flow through the fluid conduit member.

7. The generator according to claim 6, wherein the recess extends generally helically on the fluid conduit member.

8. A method of producing power in a subterranean well, the method comprising the steps of:
    attaching a piezoelectric material to a reduced thickness portion of a fluid conduit;
    interconnecting the fluid conduit in a tubular string;
    positioning the tubular string in the well; and
    flowing fluid through the fluid conduit, the piezoelectric material producing electricity in response to the flexing of the reduced thickness portion created by the flowing of fluid through the conduit,
        the reduced thickness portion having an increased degree of flexing, in response to the pressure fluctuations in the conduit, relative to the remainder of the conduit.

9. The method according to claim 8, wherein the attaching step further comprises attaching the piezoelectric material externally to the fluid conduit.

10. The method according to claim 8, wherein the flowing step further comprises inducing turbulence in the fluid flowing through the fluid conduit.

11. A method of producing power in a subterranean well, the method comprising the steps of:
    attaching a piezoelectric material to a fluid conduit;
    interconnecting the fluid conduit in a tubular string;
    positioning the tubular string in the well; and
    flowing fluid through the fluid conduit, the piezoelectric material producing electricity in response to the flowing of fluid through the conduit,
        the flowing step further comprising inducing turbulence in the fluid flowing through the fluid conduit, the inducing turbulence step further comprising shaping the fluid conduit in a manner increasing turbulence in the fluid flowing through the fluid conduit.

12. The method according to claim 11, wherein the shaping step further comprises helically forming the fluid conduit.

13. The method according to claim 11, wherein the shaping step further comprises forming a recess internally on the fluid conduit.

14. The method according to claim 13, wherein the forming step further comprises forming the recess helically on the fluid conduit.

15. An electrical power generator for use in conjunction with a subterranean well, the generator comprising:
   an outer housing;
   a mass reciprocably disposed relative to the housing;
   a piezoelectric material; and
   a bias member positioned between the mass and the piezoelectric material,
   pressure fluctuations in the housing causing the mass to displace and thereby induce strain in the piezoelectric material via the bias member.

16. The generator according to claim 15, wherein the pressure fluctuations are due to fluid flowing through the housing.

17. The generator according to claim 15, further comprising a fluid conduit extending in the outer housing, the mass, bias member and piezoelectric material being externally positioned relative to the fluid conduit.

18. The generator according to claim 17, wherein the mass, bias member and piezoelectric material are disposed in a chamber formed between the fluid conduit and the outer housing.

19. The generator according to claim 17, wherein the fluid conduit is plugged, fluid flow therethrough being bypassed to a chamber formed between the outer housing and the fluid conduit.

20. The generator according to claim 15, wherein a shape of a fluid conduit disposed within the outer housing induces turbulence in fluid flow through the fluid conduit.

21. The generator according to claim 20, wherein the fluid conduit shape is helical.

22. The generator according to claim 20, wherein the fluid conduit shape includes a recess formed on the fluid conduit.

23. The generator according to claim 22, wherein the recess extends helically on the fluid conduit.

24. The generator according to claim 20, wherein the fluid conduit shape includes a protrusion formed on the fluid conduit.

25. The generator according to claim 24, wherein the protrusion extends helically on the fluid conduit.

26. The generator according to claim 15, wherein fluid flowing through the outer housing also flows through a fluid conduit disposed within the outer housing.

27. The generator according to claim 26, further comprising a flow restriction in the fluid conduit, the flow restriction forcing at least a portion of the fluid flowing through the fluid conduit to flow between the fluid conduit and the outer housing.

28. The generator according to claim 27, wherein the flow restriction prevents fluid flow directly through the fluid conduit.

29. A method of producing power in a subterranean well, the method comprising the steps of:
   interconnecting an outer housing in a tubular string;
   positioning the tubular string in the subterranean well; and
   flowing fluid through the outer housing, thereby causing a mass to displace within the housing and induce strain in a piezoelectric material via a bias member positioned between the mass and the piezoelectric material.

30. The method according to claim 29, wherein the flowing fluid step further comprises flowing fluid through a fluid conduit extending in the outer housing, the mass, bias member and piezoelectric material being externally positioned relative to the fluid conduit.

31. The method according to claim 30, wherein in the flowing fluid step, the mass, bias member and piezoelectric material are disposed in a chamber formed between the fluid conduit and the outer housing.

32. The method according to claim 30, wherein in the flowing fluid step, the fluid conduit is plugged, fluid flow therethrough being bypassed to a chamber formed between the outer housing and the fluid conduit.

33. The method according to claim 29, wherein in the flowing fluid step, a shape of a fluid conduit disposed within the outer housing induces turbulence in fluid flow therethrough.

34. The method according to claim 33, wherein the fluid conduit shape is helical.

35. The method according to claim 33, wherein the fluid conduit shape includes a recess formed on the fluid conduit.

36. The method according to claim 35, wherein the recess extends helically on the fluid conduit.

37. The method according to claim 33, wherein the fluid conduit shape includes a protrusion formed on the fluid conduit.

38. The method according to claim 37, wherein the protrusion extends helically on the fluid conduit.

39. The method according to claim 29, wherein in the flowing fluid step, the fluid flowing through the outer housing also flows through a fluid conduit disposed within the outer housing.

40. The method according to claim 39, wherein in the flowing fluid step, a flow restriction in the fluid conduit forces at least a portion of the fluid flowing through the fluid conduit to flow between the fluid conduit and the outer housing.

41. The method according to claim 40, wherein the flow restriction prevents fluid flow directly through the fluid conduit.

42. An electrical power generator for use in conjunction with a subterranean well, the generator comprising:
   a fluid conduit configuration for flow of fluid therethrough;
   a fluid chamber in fluid communication with the fluid conduit, the chamber vibrating in response to pressure fluctuations in the fluid conduit; and
   a piezoelectric material attached to the fluid chamber, the piezoelectric material producing electricity in response to the fluid chamber vibration, the piezoelectric material being attached to the fluid conduit.

43. An electrical power generator for use in conjunction with a subterranean well, the generator comprising:
   a fluid conduit configuration for flow of fluid therethrough;
   a fluid chamber in fluid communication with the fluid conduit, the chamber vibrating in response to pressure fluctuations in the fluid conduit; and
   a piezoelectric material attached to the fluid chamber, the piezoelectric material producing electricity in response to the fluid chamber vibration,
   the fluid conduit being shaped so that it induces turbulence in fluid flow therethrough.

44. An electrical power generator for use in conjunction with a subterranean well, the generator comprising:
   a fluid conduit configuration for flow of fluid therethrough;
   a fluid chamber in fluid communication with the fluid conduit, the chamber vibrating in response to pressure fluctuations in the fluid conduit; and
   a piezoelectric material attached to the fluid chamber, the piezoelectric material producing electricity in response to the fluid chamber vibration,
   the fluid conduit being helically shaped.

45. An electrical power generator for use in conjunction with a subterranean well, the generator comprising:

a fluid conduit configuration for flow of fluid therethrough;

a fluid chamber in fluid communication with the fluid conduit, the chamber vibrating in response to pressure fluctuations in the fluid conduit; and a piezoelectric material attached to the fluid chamber, the piezoelectric material producing electricity in response to the fluid chamber vibration, the fluid conduit having a recess internally formed thereon, the recess inducing turbulence in fluid flow through the fluid conduit.

46. The generator according to claim 45, wherein the recess extends generally helically on the fluid conduit.

47. A method of producing power in a subterranean well, the method comprising steps of:

interconnecting a fluid conduit in a tubular string;

positioning the tubular string in the subterranean well;

flowing fluid through the fluid conduit;

vibrating a fluid chamber in fluid communication with the fluid conduit in response to the flowing fluid step; and producing electricity from a piezoelectric material in response to the vibrating step, the vibrating step further comprising vibrating a membrane of the fluid chamber, the piezoelectric material being attached to the membrane.

48. A method of producing power in a subterranean well, the method comprising steps of:

interconnecting a fluid conduit in a tubular string;

positioning the tubular string in the subterranean well;

flowing fluid through the fluid conduit;

vibrating a fluid chamber in fluid communication with the fluid conduit in response to the flowing fluid step; and producing electricity from a piezoelectric material in response to the vibrating step, in the vibrating step, the fluid chamber being formed between the fluid conduit and an outer housing.

49. The method according to claim 48, wherein in the producing electricity step, the piezoelectric material is attached to the outer housing.

50. A method of producing power in a subterranean well, the method comprising steps of:

interconnecting a fluid conduit in a tubular string;

positioning the tubular string in the subterranean well;

flowing fluid through the fluid conduit;

vibrating a fluid chamber in fluid communication with the fluid conduit in response to the flowing fluid step; and producing electricity from a piezoelectric material in response to the vibrating step, in the producing electricity step, the piezoelectric material being attached to a piston bounding a portion of the fluid chamber.

51. The method according to claim 50, further comprising the step of displacing the piston to thereby optimize vibration of the fluid chamber in response to fluid flow through the fluid conduit.

52. A method of producing power in a subterranean well, the method comprising steps of:

interconnecting a fluid conduit in a tubular string;

positioning the tubular string in the subterranean well;

flowing fluid through the fluid conduit;

vibrating a fluid chamber in fluid communication with the fluid conduit in response to the flowing fluid step; and producing electricity from a piezoelectric material in response to the vibrating step, in the production electricity step, the piezoelectric material being attached to the fluid conduit.

53. A method of producing power in a subterranean well, the method comprising steps of:

interconnecting a fluid conduit in a tubular string;

positioning the tubular string in the subterranean well;

flowing fluid through the fluid conduit;

vibrating a fluid chamber in fluid communication with the fluid conduit in response to the flowing fluid step; and producing electricity from a piezoelectric material in response to the vibrating step, the flow step further comprising inducing turbulence in the fluid flowing through the fluid conduit.

54. The method according to claim 53, wherein the inducing turbulence step further comprises shaping the fluid conduit in a manner increasing turbulence in the fluid flowing through the fluid conduit.

55. The method according to claim 54, wherein the shaping step further comprises helically forming the fluid conduit.

56. The method according to claim 54, wherein the shaping step further comprises forming a recess internally on the fluid conduit.

57. The method according to claim 56, wherein the forming step further comprises forming the recess helically on the fluid conduit.

58. An electrical power generator for use in conjunction with a subterranean well, the generator comprising:

a fluid conduit having a flow passage for flow of fluid therethrough;

a member extending into the flow passage, the member vibrating in response to fluid flow through the fluid conduit; and a piezoelectric material producing electricity in response to vibration of the member, the member extending generally transversely relative to the flow passage, the fluid conduit being generally tubular and being connectable in a tubular string positioned in the subterranean well.

59. An electrical power generator for use in conjunction with a subterranean well, the generator comprising:

a fluid conduit having a flow passage for flow of fluid therethrough;

a member extending into the flow passage, the member vibrating in response to fluid flow through the fluid conduit; and a piezoelectric material producing electricity in response to vibration of the member, the piezoelectric material supporting the member in position relative to the fluid conduit.

60. The generator according to claim 59, wherein the piezoelectric material encircles the member.

61. The generator according to claim 59, wherein the member extends into a recess formed internally on the fluid conduit.

62. The generator according to claim 61, wherein the piezoelectric material is disposed in the recess between the member and the fluid conduit.

63. An electrical power generator for use in conjunction with a subterranean well, the generator comprising:

a fluid conduit member having a flow passage for flow of fluid therethrough;

a vibratable member extending into the flow passage, the vibratable member vibrating in response to fluid flow through the fluid conduit member; and a piezoelectric material producing electricity in response to vibration of the vibratable member, the piezoelectric material being carried by the fluid conduit member, the fluid conduit member further having a protrusion extending inwardly into the flow passage, the protrusion inducing turbulence in fluid flow through the flow passage, thereby increasing vibration of the vibratable member.

64. A method of producing power in a subterranean well, the method comprising the steps of:

interconnecting in a tubular string a fluid conduit having a flow passage;

positioning the tubular string in the subterranean well;

flowing fluid through the flow passage;

vibrating a member extending into the flow passage in response to the flowing fluid step; and producing electricity from a piezoelectric material in response to the member vibrating step, the flowing step further comprising flowing fluid transversely across the member.

65. A method of producing power in a subterranean well, the method comprising the steps of:

interconnecting in a tubular string a fluid conduit having a flow passage;

positioning the tubular string in the subterranean well;

flowing fluid through the flow passage;

vibrating a member extending into the flow passage in response to the flowing fluid step; and producing electricity from a piezoelectric material in response to the member vibrating step, the producing electricity step further comprising supporting the member relative to the fluid conduit utilizing the piezoelectric material.

66. The method according to claim 65, wherein the supporting step further comprises encircling the member with the piezoelectric material.

67. The method according to claim 65, wherein the supporting step further comprises positioning the piezoelectric material between the member and the fluid conduit in a recess formed internally on the fluid conduit.

68. A method of producing power in a subterranean well, the method comprising the steps of:

interconnecting in a tubular string a fluid conduit having a flow passage;

positioning the tubular string in the subterranean well;

flowing fluid through the flow passage;

vibrating a member extending into the flow passage in response to the flowing fluid step;

producing electricity from a piezoelectric material in response to the member vibrating step; and inducing turbulence in the flow passage upstream of the member, thereby increasing vibration of the member in the member vibrating step.

69. The method according to claim 68, wherein the inducing turbulence step further comprises providing a protrusion extending inwardly into the flow passage.

70. An electrical power generator for use in conjunction with a subterranean well, the generator comprising:

a fluid conduit;

a member having an orifice formed therethrough, fluid flow through the fluid conduit also flowing through the orifice, and the member vibrating in response to fluid flow through the orifice; and a piezoelectric material disposed proximate the member, the piezoelectric material producing electricity in response to vibration of the member, the piezoelectric material being disposed in a recess formed internally on the fluid conduit.

71. The generator according to claim 70, wherein a portion of the member extends into the recess.

72. The generator according to claim 71, wherein the piezoelectric material is positioned between the portion of the member and the fluid conduit in the recess.

73. An electrical power generator for use in conjunction with a subterranean well, the generator comprising:

a fluid conduit;

a member having an orifice formed therethrough, fluid flow through the fluid conduit also flowing through the orifice, and the member vibrating in response to fluid flow through the orifice;

a piezoelectric material disposed proximate the member, the piezoelectric material producing electricity in response to vibration of the member; and a structure inducing turbulence in fluid flow through the fluid conduit.

74. The generator according to claim 73, wherein the structure extends generally transversely to a flow passage formed through the fluid conduit.

75. A method of producing power in a subterranean well, the method comprising the steps of:

interconnecting in a tubular string a power generator including a member having an orifice formed therethrough;

positioning the tubular string in the subterranean well;

flowing fluid through the orifice;

vibrating the member in response to the flowing fluid step;

producing electricity from a piezoelectric material in response to the member vibrating step; and inducing turbulence in fluid flowing through the orifice.

76. The method according to claim 75, wherein the inducing turbulence step further comprises positioning a structure in the fluid conduit upstream of the member.

77. The method according to claim 76, wherein the positioning step further comprises positioning the structure so that it extends generally transversely relative to a flow passage formed through the fluid conduit.

78. An electrical power generator for use in conjunction with a subterranean well, the generator comprising:

a fluid conduit member;

a displaceable member disposed within and supported by the fluid conduit member, the displacing member displacing within the fluid conduit member in response to fluid flow through the fluid conduit member;

a retainer preventing displacement of the displaceable member out of the fluid conduit member; and a piezoelectric material producing electricity in response to displacement of the displaceable member.

79. The generator according to claim 78, wherein the piezoelectric material is disposed between the retainer and the fluid conduit member.

80. An electrical power generator for use in conjunction with a subterranean well, the generator comprising:

a fluid conduit;

a member disposed within the fluid conduit, the member displacing within the fluid conduit in response to fluid flow through the fluid conduit;

a retainer preventing displacement of the member out of the fluid conduit; and a piezoelectric material producing electricity in response to displacement of the member, the piezoelectric material being disposed between the member and the fluid conduit, and the piezoelectric material supporting the member within the fluid conduit.

81. An electrical power generator for use in conjunction with a subterranean well, the generator comprising:

a fluid conduit;

a member disposed within the fluid conduit, the member displacing within the fluid conduit in response to fluid flow through the fluid conduit;

a retainer preventing displacement of the member out of the fluid conduit; and a piezoelectric material producing electricity in response to displacement of the member, the piezoelectric material being disposed between the retainer and the fluid conduit, and the piezoelectric material supporting the retainer.

82. An electrical power generator for use in conjunction with a subterranean well, the generator comprising:

a fluid conduit;

a member disposed within the fluid conduit, the member displacing within the fluid conduit in response to fluid flow through the fluid conduit;

a retainer preventing displacement of the member out of the fluid conduit; and a piezoelectric material producing electricity in response to displacement of the member, the member contacting the retainer in response to fluid flow through the fluid conduit, the piezoelectric material producing electricity in response to such contact.

83. A method of producing power in a subterranean well, the method comprising the steps of:

interconnecting a fluid conduit in a tubular string;

positioning the tubular string in the subterranean well;

flowing fluid through the fluid conduit;

displacing a member within the fluid conduit in response to the flowing fluid step; and producing electricity from a piezoelectric material in response to the member displacing step.

84. The method according to claim 83, wherein in the member displacing step, the member is prevented from displacing out of the fluid conduit by a retainer.

85. The method according to claim 84, wherein the member displacing step further comprises contacting the retainer with the member, and wherein in the producing electricity step, the piezoelectric material produces electricity in response to the member contacting the retainer.

86. The method according to claim 84, further comprising the step of supporting the retainer utilizing the piezoelectric material.

87. The method according to claim 83, further comprising the step of supporting the member in the fluid conduit utilizing the piezoelectric material.

88. An electrical power generator for use in conjunction with a subterranean well, the generator comprising:

a fluid conduit having a flow passage formed therethrough and a cavity;

a membrane separating the flow passage from the cavity, the membrane flexing in response to pressure fluctuations in the flow passage, the cavity being generally annularly shaped and outwardly surrounding the membrane, in a telescoped relationship therewith; and a piezoelectric material disposed within the cavity, the piezoelectric material producing electricity in response to the membrane flexing.

89. The generator according to claim 88, wherein the pressure fluctuations are due to fluid flow through the flow passage.

90. The generator according to claim 88, wherein the membrane is generally tubular.

91. The generator according to claim 88, wherein the membrane sealingly isolates the cavity from the flow passage.

92. The generator according to claim 91, wherein the cavity is at atmospheric pressure.

93. The generator according to claim 88, wherein the piezoelectric material is generally annular shaped and outwardly surrounds the membrane.

94. A method of producing power in a subterranean well, the method comprising the steps of:

interconnecting a fluid conduit in a tubular string;

positioning the tubular string in the subterranean well;

flowing fluid through a flow passage of the fluid conduit;

flexing a membrane separating the flow passage from a cavity of the fluid conduit in response to the flowing fluid step; and producing electricity from a piezoelectric material in response to the membrane flexing step.

95. The method according to claim 94, wherein in the membrane flexing step, the membrane is generally tubular.

96. The method according to claim 94, wherein the flowing fluid step further comprises flowing fluid through the membrane.

97. The method according to claim 94, further comprising the step of sealingly isolating the flow passage from the cavity utilizing the membrane.

98. The method according to claim 94, wherein in the membrane flexing step, the cavity is at a reduced pressure relative to the flow passage.

99. The method according to claim 98, wherein in the membrane flexing step, the cavity is at atmospheric pressure.

100. The method according to claim 94, wherein in the membrane flexing step, the cavity outwardly surrounds the membrane.

101. The method according to claim 94, wherein in the producing electricity step, the piezoelectric material outwardly surrounds the membrane.

* * * * *